United States Patent [19]

Saxton et al.

[11] Patent Number: 5,030,386

[45] Date of Patent: Jul. 9, 1991

[54] BATIO3 CERAMIC TEMPERATURE SENSOR WITH IMPROVED POSITIVE TEMPERATURE COEFFICIENT OF RESISTANCE

[75] Inventors: Jay G. Saxton, Portland, Me.; Kazumasa Umeya, Danvers, Mass.

[73] Assignee: GTE Products Corporation, Stamford, Conn.

[21] Appl. No.: 144,741

[22] Filed: Jan. 19, 1988

Related U.S. Application Data

[63] Continuation of Ser. No. 704,118, Feb. 22, 1985, abandoned.

[51] Int. Cl.$^5$ .............................................. C04B 35/46
[52] U.S. Cl. .................................. 252/520; 252/521; 501/137; 501/139
[58] Field of Search ...................... 501/138, 139, 137; 252/519, 520, 521

[56] References Cited

U.S. PATENT DOCUMENTS

| | | | |
|---|---|---|---|
| 2,836,501 | 5/1958 | Crownover | 501/138 X |
| 3,373,120 | 3/1968 | Nitta et al. | 501/139 X |
| 3,586,642 | 10/1968 | Matsuo et al. | 501/139 X |
| 3,975,307 | 8/1976 | Matsuo et al. | 501/139 X |
| 3,983,077 | 9/1976 | Fuller et al. | 501/137 X |
| 4,022,716 | 5/1977 | Ueoka et al. | 501/137 X |
| 4,222,783 | 9/1980 | Atsumi et al. | 501/139 X |
| 4,483,933 | 11/1984 | Kobayashi et al. | 501/139 X |

FOREIGN PATENT DOCUMENTS

| | | | |
|---|---|---|---|
| 2446029 | 4/1976 | Fed. Rep. of Germany | 501/139 |
| 4749677 | 12/1972 | Japan . | |

Primary Examiner—Karl Group
Attorney, Agent, or Firm—James Theodosopoulos

[57] ABSTRACT

Iron is used as a dopant in barium titanate semiconductor ceramic material to increase the positive temperature coefficient of resistance thereof. By the use of about 0.010 to 0.500 weight percent silica and about 0.0075 to 0.0190 weight percent iron, room temperature resisitivity can be kept adequately low while the temperature coefficient of resistance is significantly increased.

7 Claims, 1 Drawing Sheet

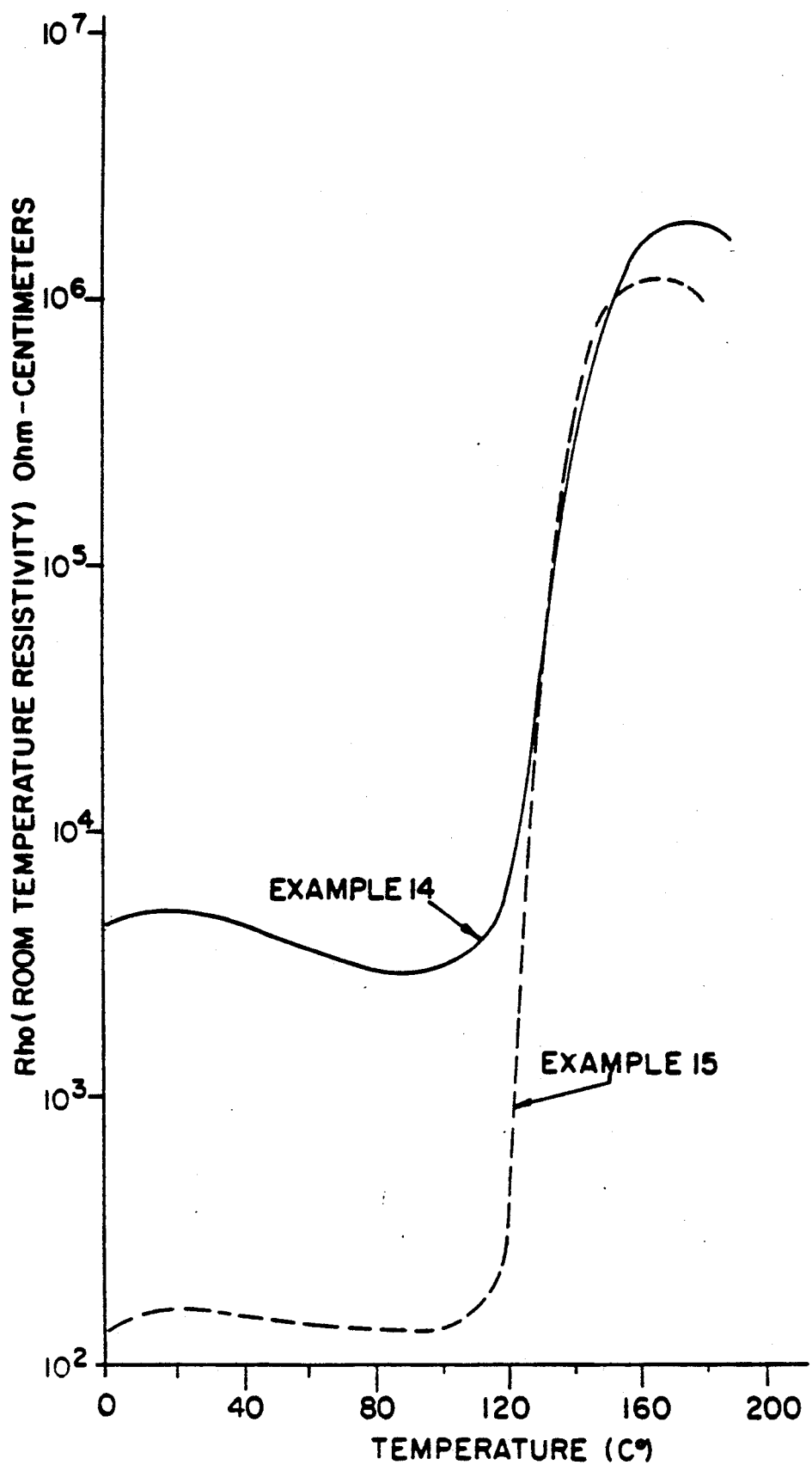

BATIO3 CERAMIC TEMPERATURE SENSOR WITH IMPROVED POSITIVE TEMPERATURE COEFFICIENT OF RESISTANCE

This application is a continuation of application Ser. No. 704,118, filed Feb. 22, 1985, abandoned.

This invention relates to a semiconductor ceramic material with a high temperature coefficient of resistance.

It is generally considered that barium titanate, which is widely known to be a ferroelectric material, is an insulator of a high resistivity of more than approximately $10^{10}$ ohm-cm. However, it is commonly known that, when rare-earth elements such as La, Ce, Y, etc. or elements such as Bi, W, Nb, Ta, etc. are added to a highly pure barium titanate raw material, and when the mixture is sintered by means of a method normally employed by the ceramics industry, the thus treated mixture attains a low level of resistivity at room temperature, i.e., approximately $10^1$ to $10^4$ ohm-cm, thereby transforming itself into a semiconductor. The resistance-temperature characteristic curve of the thus produced semiconductor ceramic shows a sharp rise in the vicinity of the Curie point. Experiments have been conducted recently for the purpose of further enhancing the rate of change in the resistance by adding elements such as Mn, Cr, Fe, Cu, V, etc. to the composition. It is evident that the temperature characteristics curve of the resistance rate of the thus prepared materials rises steeply, thereby improving the resistance-temperature characteristics.

However, the pace of progress in technology is rapid, so that the demand from the market is constantly intensifying for better quality and higher performance semiconductor ceramics materials. The barium titanate semiconductor ceramic material is no exception in this respect. Along with the progress in the sophistication of the electronic circuitry technology, a higher level of resistance-temperature coefficient is required of the components used in electronic control circuits.

In particular, as a component used for temperature sensing and detection in electrical circuits, it has become desirable to obtain a thermistor element of a particularly sharp rising resistance-temperature characteristic in order to achieve higher control in the circuits.

An object of this invention is to fulfill the need for a semiconductor ceramic material of such characteristics. The invention features a remarkable improvement in the temperature coefficient of resistance, hereafter alpha, of a barium titanate semiconductor material by means of adding iron from about 0.0075 to 0.019 weight percent in Fe ion amount and silica from about 0.01 to 0.5 weight percent in $SiO_2$ amount.

A comparison between the method of this invention and the method of the conventional technique (Japanese Patent SHO-47-49677) is a follows.

With the conventional technique, only Fe ion was added to the barium titanate semiconductor raw materials for the purpose of improving the resistance-temperature characteristic, so that the extent of Fe ion which was added to improve alpha was limited to a maximum of 0.007 weight percent. In a region where the amount of the added Fe ion is approximately 0.008 weight percent, the room temperature resistivity, hereafter rho, of the barium titanate semiconductor increases to approximately $10^4$ ohm-cm, and at the same time, alpha of the semiconductor decreases to approximately 10%/°C.

This being the case, a barium titanate semiconductor of such characteristics has so far been deemed unfit for use as a thermistor element of which a high level of alpha is required.

Further, with the conventional technique, it has been necessary to control the added amount of the Fe ion within an extremely low region of less than 0.007 weight percent, thereby presenting a shortcoming that errors in measuring the additive Fe ion contribute greatly to irregularities in the electrical characteristics of the product semiconductors when they are mass produced.

With this invention, however, it becomes possible, as a result of the simultaneous addition of $SiO_2$ and Fe ion, to increase to about 0.019 weight percent the upper limit of the added amount of the Fe ion for the purpose of improving alpha.

Consequently, even within the region of the added Fe ion amount of 0.008 weight percent where, with the conventional technique, rho of the product semincon-ductors was approximately $10^4$ ohm-cm and alpha was approximately 10%/°C., the method of this invention makes it possible to maintain rho of the product semiconductor at approximately 70 ohm-cm, while achieving a level of alpha as high as about 38%/°C., thereby enabling the use of such a semiconductor as a thermistor element of which a high level of alpha is required.

Further, even within the region of the added Fe ion amount of 0.015 to 0.018 weight percent where, with the conventional technique, the product becomes an insulator rather than a semiconductor, thereby no longer showing PTC characteristics, the method of this invention still makes it possible to maintain a sharp-rising PTC characteristic curve, while maintaining alpha at a level of approximately 30%/°C., thereby amply enabling use of the product as a thermistor element.

Also, with this invention, the upper limit of the additive Fe ion for improving alpha has been increased to a level approximately 2.7 times as high as the conventionally achieved upper limit of the Fe ion. Therefore, it has become possible with this invention to reduce the irregularities in the electrical characteristics of the product semiconductors as thermistor elements, said irregularities having been caused by measuring errors when adding the Fe ion, thereby facilitating mass production of the semiconductor ceramics for PTC thermistor elements.

On the basis of the above-mentioned facts, the following will further explain this invention by referring to several examples.

As starting materials, high purity $BaCO_3$, $SrCO_3$, $TiO_2$, $SiO_2$ and $Y_2O_3$ were used. The level of purity of these materials was sufficiently high for manufacturing barium titanate semiconductors. A water solution of $Fe(NO_3)_3$ was used for the iron additive. These raw materials and the additive iron were so blended by using a ball mill (an agate ball mill) that the compositions of the mixture after sintering become such as shown in Table 1. The mixture was then calcined at a temperature ranging from 1,100° C. to 1,200° C.

After calcining, the mixture was crushed by wet process in a ball mill which is similar to the one used when the raw materials were first blended.

The thus produced slurry by the wet process crushing was de-watered and dried, and binders were added for the purpose of pelletizing. Thereafter, the pellets were formed into discs under 1,000 kg/cm² forming pressure. These discs were then sintered at 1,280° C. to 1,360° C., thereby obtaining semiconductor ceramic material discs. An electrode made of In-Ga alloy was attached to each surface of the thus produced semiconductor ceramic disc, and rho and alpha were measured while the disc was heated in silicone oil.

Alpha has been calculated by using the following equation:

$$\text{Alpha} = 2.303 \frac{(\log_{10} R_2 - \log_{10} R_1)}{T_2 - T_1} \times 100 \, (\%/°C.),$$

where $R_2$ and $R_1$ equal the resistances at temperatures $T_2$ and $T_1$, respectively.

As shown by Example 1 in the Table, alpha is merely approximately 10%/°C. when the Fe content is 0. However, the inventors discovered that when the added Fe amount is increased to 0.006 weight percent (Example 2), alpha increased to approximately 20%/°C. When the added amount is further increased to 0.01 weight percent (Example 5), alpha attained 41%/°C., which has not been feasible so far with the conventional technique.

With the conventional technique, it has been considered that the upper limit of Fe content is 0.0070 weight percent, beyond which rho of the product semiconductors exceeds the usable limit of about 500 ohm-cm. With this invention, however, it is possible to attain a high level of alpha while maintaining rho amply within the usable range owing to the addition of a slight amount of $SiO_2$ as specified earlier, even in such a region of the additive Fe ion amount where the conventional technique failed to produce usable products due to an excessive increase in rho. The effect of the addition of silica is shown in the drawing. The curve labeled Example 14 is without silica, while the curve labeled Example 15 is with silica. It can be seen that the silica significantly reduced rho and increased alpha, the slope of the curve.

Here, it is considered that the upper limit of the addition of the Fe ion to produce a usable product is in the vicinity of 0.019 weight percent in view of the fact, demonstrated by Example 13 of Table 1, that at a level of 0.20 weight percent, there is an adverse increase in rho as well as an adverse decrease in alpha.

Concerning barium titanate semiconductor ceramics, experiments have so far been conducted generally by partially substituting PbO or SrO for BaO or partially substituting $SnO_2$ for $TiO_2$ for the purpose of shifting the Curie point. Accordingly, the inventors investigated the extent of effects exerted by the Fe ion to the resistance-temperature characteristics of the product by preparing a mixture in which part of BaO has been substituted with PbO or SrO, said partial substitution of BaO with PbO or SrO having been effected within a range of 5 to 20 mol percent. This experiment was conducted in order to confirm whether or not it is possible to maintain a high alpha such as in the case of the semiconductor ceramic of this invention, in spite of said partial substitution.

Concurrently, the same experiment was conducted concerning a mixture in which part of the $TiO_2$ was substituted with $SnO_2$. Here, the composition of the starting raw materials and the method of preparing samples were the same as those employed above.

The obtained results are shown as Examples 16 through 20 in Table 1. As shown by these results, it it possible to maintain a high level of alpha in the case of a composition containing PbO and $SnO_2$.

In order to achieve semiconductive properties, the raw materials for the barium titanate type semiconductor are mixed with a slight amount of rare-earth elements such as Y, Ce, La, etc. or elements such as Nb, Ta, W, Bi, etc. In this invention, $Y_2O_3$ has been mainly used as the additive for this purpose. The inventors investigated as to whether or not it is possible to maintain the improvement in alpha which was achieved by the addition of the Fe ion, in spite of simultaneously adding elements other than $Y_2O_3$. Here, as the representative semiconductorizing additives, CeO, $LaO_3$, $Ta_2O_5$, and $Dy_2O_3$ were used. The composition of the starting raw materials and the method of preparing the samples were the same as those employed above.

The obtained results are shown as Examples 26 through 29 in Table 1. As shown by these results, it is possible, with this invention, to maintain the level of alpha as high as in the case of using Y as the additive, even when elements other than Y are used as the semiconductorizing additives.

In this invention, it is likely that the added amount of silica exerts an influence on the resultant temperature coefficient of the product semiconductor ceramic. In order to clarify the extent of the influence of silica, the inventors investigated the relationship between the adding amount of silica and the resultant electrical characteristics of the product semiconductor ceramic. As the silica source, low-impurity $SiO_2$ was used as one of the starting raw materials. The composition of the starting raw materials other than $SiO_2$ and the method of preparing the samples were same as those employed above.

The experiment was conducted up to a maximum $SiO_2$ adding amount of 0.7 weight percent. The obtained results are shown as Examples 7 through 10 of Table 1.

When the $SiO_2$ adding amount reaches 0.7 weight percent, alpha drops to show an undesirable result. It is therefore considered that the desirable upper limit of $SiO_2$ adding amount be in the vicinity of 0.5 weight percent. Also, when the $SiO_2$ adding amount is zero, rho becomes undesirably high. It is therefore considered that the desirable lower limit of $SiO_2$ adding amount be in the vicinity of 0.01 weight percent.

In the foregoing paragraphs, an explanation has been made concerning the effects of adding the Fe ion to the composition of several representative barium titanate semiconductors, said Fe ion addition being effected for the purpose of improving the resistance-temperature characteristics; however, it is clearly understood here that the effects of adding the Fe ion are similarly manifested in the case of all the compositions, so long as the compositions are of the barium titanate semiconductor raw materials in general.

In view of the above results, it is considered that, by using the barium titanate semiconductor ceramic of this invention as a thermistor element, it becomes possible to design circuitry elements of satisfactorily high temperature control capacity, thereby significantly contributing to the progress of the industrial technology.

TABLE 1

| Example | Mol Percent Ba | Sr | Y | Ti | Weight Percent Fe | SiO$_2$ | Rho ohm-cm | Alpha %/°C |
|---|---|---|---|---|---|---|---|---|
| 1 | 0.872 | 0.125 | 0.003 | 1.00 | 0 | 0.01 | 15 | 10.2 |
| 2 | " | " | " | " | 0.006 | " | 52 | 21 |
| 3 | " | " | " | " | 0.007 | " | 55.5 | 25 |
| 4 | " | " | " | " | 0.008 | " | 68 | 38 |
| 5 | " | " | " | " | 0.010 | " | 150 | 41 |
| 6 | " | " | " | " | 0.015 | " | 1.7 × 10$^3$ | 30 |
| 7 | " | " | " | " | 0.008 | 0.02 | 70 | 38 |
| 8 | " | " | " | " | " | 0.05 | 67 | 37 |
| 9 | " | " | " | " | " | 0.10 | 62 | 36 |
| 10 | " | " | " | " | 0.015 | 0.70 | 81 | 18 |
| 11 | " | " | " | " | " | 0.50 | 110 | 24 |
| 12 | " | " | " | " | 0.018 | " | 515 | 27 |
| 13 | " | " | " | " | 0.020 | " | 8.7 × 10$^3$ | 18 |
| 14 | 0.997 | 0 | " | " | 0.010 | 0 | 4.9 × 10$^3$ | 22 |
| 15 | 0.997 | 0 | " | " | 0.010 | 0.01 | 165 | 41 |
| 16 | 0.947 | Pb .05 | " | " | " | " | 180 | 42 |
| 17 | 0.897 | Pb .10 | " | " | " | " | 195 | 43 |
| 18 | 0.797 | Pb .20 | " | " | " | " | 300 | 45 |
| 19 | 0.947 | Sn .05 | " | 0.95 | " | " | 200 | 29 |
| 20 | 0.897 | Sn .10 | " | 0.90 | " | " | 386 | 27 |
| 21 | 0.998 | — | 0.002 | 1.00 | 0.010 | 0.05 | 570 | 38 |
| 22 | 0.996 | — | 0.004 | " | " | " | 62 | 36 |
| 23 | 0.995 | — | 0.005 | " | " | " | 90 | 35 |
| 24 | 0.994 | — | 0.006 | " | " | " | 780 | 34 |
| 25 | 0.993 | — | 0.007 | " | " | " | 5.1 × 10$^4$ | 22 |
| 26 | 0.997 | — | Ce .003 | " | " | " | 82 | 36 |
| 27 | " | — | La .003 | " | " | " | 90 | 35 |
| 28 | " | — | Ta .003 | " | " | " | 110 | 33 |
| 29 | " | — | Dy .003 | " | " | " | 95 | 34 |

We claim:

1. In a barium titanate positive temperature coefficient of resistance semiconductor composition to which a small amount of Fe ion has been added in order to increase alpha, the temperature coefficient of resistance, the improvement comprising adding a small effective amount of silica in the form of SiO$_2$ to the composition in order to permit a greater amount of Fe to be included in the composition than if there were no SiO$_2$ present, the amount of added silica being effective to reduce the room temperature resistivity of the composition below that of the composition without the silica, the amount of added silica being effective to increase alpha of the composition above that of the composition without the silica.

2. The composition of claim 1 wherein the amount of added silica is from about 0.01 to 0.5 weight percent of the composition.

3. The composition of claim 1 containing barium, strontium, yttrium and titanium and having the composition shown in any of Examples 2, 3, 4, 5, 6, 7, 8, 9, 11 or 12 in Table 1.

4. The composition of claim 1 containing barium, yttrium and titanium and having the composition shown in Example 15 of Table 1.

5. The composition of claim 1 containing barium, lead, yttrium and titanium and having the composition shown in any of Examples 16, 17 or 18 in table 1.

6. The composition of claim 1 containing barium, tin, yttrium and titanium and having the composition shown in Examples 19 or 20 in Table 1.

7. The composition of claim 1 containing barium, yttrium, titanium and either cerium or lanthanum or tantalum or dysprosium and having the composition shown in any of Examples 26, 27, 28 or 29 in Table 1.

* * * * *